United States Patent [19]

Pedrazzi

[11] Patent Number: 5,122,605
[45] Date of Patent: Jun. 16, 1992

[54] SULFO GROUP CONTAINING TRIPHENDIOXAZINES HAVING AT LEAST ONE 1,3,5-TRIAZINE RING

[75] Inventor: Reinhard Pedrazzi, Allschwil, Switzerland

[73] Assignee: Sandoz Ltd., Basel, Switzerland

[21] Appl. No.: 484,582

[22] Filed: Feb. 23, 1990

[30] Foreign Application Priority Data

Feb. 24, 1989 [DE] Fed. Rep. of Germany ....... 3905673

[51] Int. Cl.⁵ ............... C09B 62/04; C09B 19/02; C09B 67/26; D06P 1/382
[52] U.S. Cl. .................... 544/76; 534/617; 534/618; 534/619; 534/624; 534/625; 534/628; 534/634; 534/635; 540/126; 8/527; 8/549
[58] Field of Search .............. 544/72, 75, 76, 77; 534/617, 618, 619, 625, 635, 624, 628; 540/126; 8/527, 529

[56] References Cited

U.S. PATENT DOCUMENTS

| | | | |
|---|---|---|---|
| 2,763,641 | 9/1956 | Seitz et al. | 544/76 X |
| 2,954,378 | 9/1960 | Pugin et al. | 544/76 |
| 3,117,957 | 1/1964 | Boyd et al. | 544/76 X |
| 3,177,214 | 4/1965 | Sulzer et al. | 544/76 X |
| 3,310,556 | 3/1967 | Von Der Crone et al. | 544/76 X |
| 4,092,478 | 5/1978 | Plant et al. | 544/76 |
| 4,261,889 | 4/1981 | Seiler et al. | 534/619 X |
| 4,841,049 | 6/1989 | Seitz | 544/76 |
| 4,990,615 | 2/1991 | Henk et al. | 544/76 |

FOREIGN PATENT DOCUMENTS

| | | |
|---|---|---|
| 176196 | 4/1986 | European Pat. Off. |
| 256650 | 2/1988 | European Pat. Off. |
| 361186 | 4/1990 | European Pat. Off. |
| 425907 | 5/1991 | European Pat. Off. |
| 1345146 | 1/1974 | United Kingdom |
| 1450746 | 9/1976 | United Kingdom |
| 155429 | 10/1979 | United Kingdom |

Primary Examiner—Mary C. Lee
Assistant Examiner—Fiona T. Powers
Attorney, Agent, or Firm—Gerald D. Sharkin; Richard E. Vila; Melvyn M. Kassenoff

[57] ABSTRACT

Sulpho group-containing dioxazine compounds corresponding to the formula

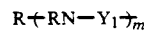

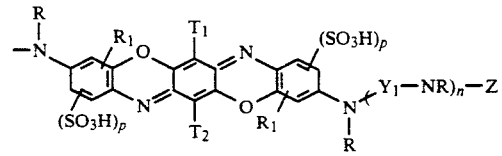

in which the symbols are as defined in the specification, and salts thereof as well as dyeing preparations thereof are useful for dyeing or printing hydroxy group- or nitrogen-containing organic substrates, optionally combined with a special after-treatment of the dyed or printed textiles thus obtained to improve their wet fastness properties. Most preferred substrates are textile material containing or consisting of cellulose and paper.

21 Claims, No Drawings

SULFO GROUP CONTAINING TRIPHENDIOXAZINES HAVING AT LEAST ONE 1,3,5-TRIAZINE RING

This invention relates to sulpho group-containing dioxazine compounds having a triazinylamino bridge and their salts, a process for their production and processes for dyeing or printing hydroxy group- or nitrogen-containing organic substrates using these compounds, optionally combined with a special after-treatment of the dyeings or prints obtained, as well as dyeing preparations thereof.

More particularly, this invention provides compounds of formula I

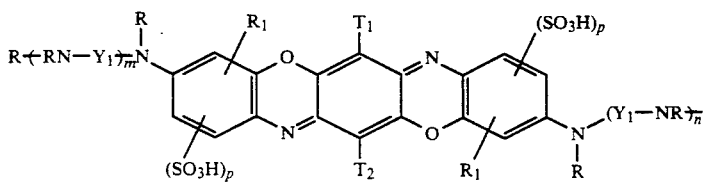

and salts thereof, in which each R, independently, is hydrogen, $C_{1-6}$alkyl or $C_{1-6}$alkyl monosubstituted by halogen, cyano, hydroxy, $C_{1-4}$alkoxy, —COOH, —SO$_3$H or —O-SO$_3$H, each $R_1$, independently, is hydrogen, halogen, $C_{1-4}$alkyl, $C_{1-4}$alkoxy or —COOH, each $T_1$ and $T_2$, independently, is hydrogen, chlorine, bromine, unsubstituted $C_{1-4}$alkyl or $C_{1-4}$alkoxy, or $C_{1-4}$alkyl or $C_{1-4}$alkoxy monosubstituted by chlorine, methoxy, ethoxy or —OSO$_3$H, unsubstituted phenyl or phenoxy, or phenyl or phenoxy which are substituted by one or two substituents selected from chlorine, bromine, methyl, ethyl, methoxy and ethoxy, each $Y_1$, independently, is —$C_{2-6}$alkylene-, monohydroxy- or dihydroxy-substituted —$C_{3-6}$alkylene-, —$C_{3-6}$alkylene- which is interrupted by —O—, —S— or —NR—, unsubstituted cyclohexylene or cyclohexylene which is substituted by up to three methyl groups,

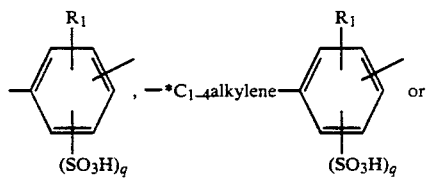

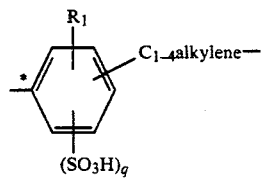

in which $R_1$ is as defined above and each asterisk identifies the carbon atom which is attached to the amino group bound to the ring system, or each —NR—$Y_1$—NR—, independently, is

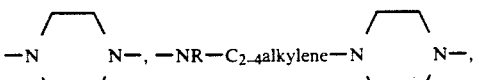

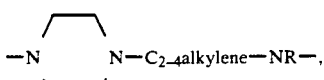

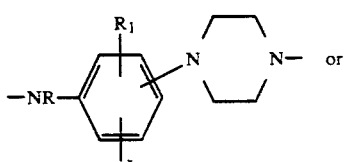

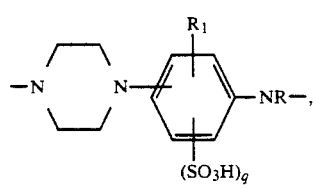

in which R and $R_1$ are as defined above,

Z is

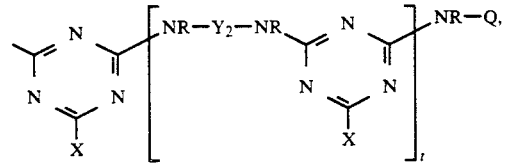

each X, independently, is halogen or an unsubstituted or substituted amino group, each R is as defined above, $Y_2$ is a bridging group selected from a divalent aliphatic, cycloaliphatic, aromatic and aliphatic-aromatic group, where each such group is unsubstituted or substituted and where each aliphatic group is optionally interrupted by —O—, —S— or —NR—, or —NR—$Y_2$—NR— is

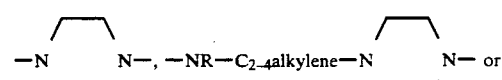

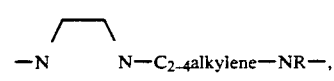

Q is a chromophoric radical selected from the series of azo-, formazan-, anthraquinone-, phthalocyanine- and dioxazine- dyestuffs, each m and n, independently, is 0 or 1, each p, independently, is 0, 1 or 2, each q, independently, is 0 or 1, and t is 0 or 1, provided that in a compound of formula I at least one sulphonic acid group is present, and mixtures of compounds of formula I.

In the specification, any alkyl or alkylene group present is linear or branched unless indicated otherwise. In any hydroxy- or alkoxy-substituted alkyl or alkylene group which is attached to a nitrogen atom, the hydroxy or alkoxy group is preferably bound to a carbon atom which is not directly bound to this nitrogen atom. In any alkylene chain interrupted by —O—, —S— or —NR— which is bound to a nitrogen atom, preferably the —O—, —S— or —NR— is bound to a carbon atom which is not directly attached to this nitrogen atom.

Any halogen is preferably fluorine, chlorine or bromine; more preferably it is chlorine or bromine, especially chlorine.

Any unsubstituted alkyl group as R preferably contains 1–4 carbon atoms and is more preferably methyl or ethyl. When R is a monosubstituted alkyl group, it is preferably substituted by chlorine, cyano, hydroxy, methoxy, —COOH, —SO$_3$H or —OSO$_3$H.

Each R is preferably R$_a$, where each R$_a$ independently is hydrogen, C$_{1-4}$alkyl or C$_{1-4}$alkyl monosubstituted by chlorine, cyano, hydroxy, methoxy, —COOH, —SO$_3$H or —OSO$_3$H. More preferably it is R$_b$, where each R$_b$ independently is hydrogen, methyl, ethyl or C$_{2-3}$alkyl monosubstituted by hydroxy or methoxy. Even more preferably it is R$_c$, where each R$_c$ is independently hydrogen or methyl. Most preferably each R is hydrogen.

Any alkyl or alkoxy as R$_1$ preferably contains 1 or 2 carbon atoms.

Each R$_1$ is preferably R$_{1a}$, where each R$_{1a}$ independently is hydrogen, chlorine, methyl, ethyl, methoxy, ethoxy or —COOH. More preferably it is R$_{1b}$, where each R$_{1b}$ is independently hydrogen, chlorine, methyl, methoxy or —COOH. Most preferably, each R$_1$ is hydrogen.

T$_1$ is preferably T$_{1a}$ and T$_2$ is preferably T$_{2a}$, where each T$_{1a}$ and T$_{2a}$ independently is hydrogen, chlorine, bromine, methyl, ethyl, methoxy, ethoxy, unsubstituted phenyl or phenoxy or phenyl or phenoxy which is substituted by one or two substituents selected from chlorine, bromine, methyl, ethyl, methoxy and ethoxy. It is particularly preferred that both T$_1$ and T$_2$ are chlorine.

Each Y$_1$ is preferably Y$_{1a}$, where each Y$_{1a}$ independently is —C$_{2-6}$alkylene-, monohydroxy-substituted —C$_{3-6}$alkylene-, —C$_{3-6}$alkylene- which is interrupted by —O—, —S— or —NR$_b$—, cyclohexylene,

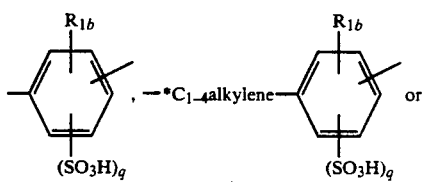

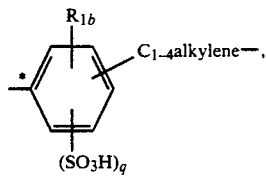

or each —NR—Y$_1$—NR— is preferably —NR$_b$—Y$_{1a}$—NR$_b$—, where each —NR$_b$—Y$_{1a}$—NR$_b$— independently is

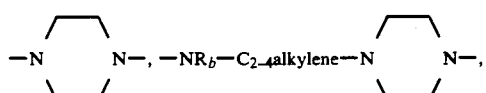

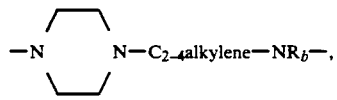

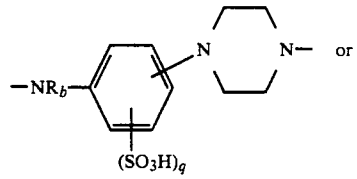

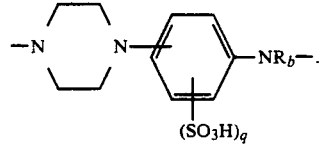

More preferably Y$_1$ is Y$_{1b}$, where each Y$_{1b}$ independently is —C$_{2-4}$-alkylene-, monohydroxy-substituted —C$_{3-4}$alkylene-,

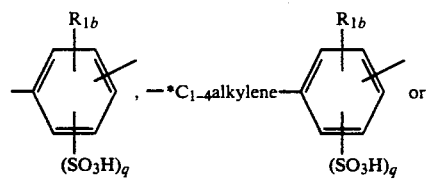

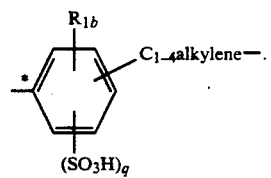

Any aliphatic bridging group as Y$_2$ is preferably —C$_{2-6}$alkylene- which may be interrupted by —O—, —S— or —NR—, or monohydroxy- or dihydroxy-substituted —C$_{3-6}$alkylene-.

Any cycloaliphatic group as Y$_2$ is preferably cyclohexylene which is unsubstituted or substituted by up to three methyl groups.

Any aromatic or aliphatic-aromatic bridging group as Y$_2$ is preferably

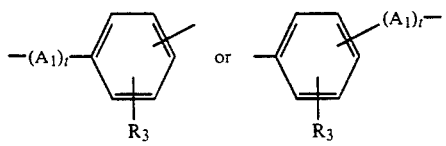

in which $A_1$ is —$C_{1-4}$alkylene-, t is 0 or 1 and $R_3$ is hydrogen, chlorine, $C_{1-4}$alkyl, $C_{1-4}$alkoxy, —COOH or —SO$_3$H. More preferably $R_3$ is $R_{3a}$, where $R_{3a}$ is hydrogen, chlorine, methyl, methoxy, —COOH or —SO$_3$H.

$Y_2$ is preferably $Y_{2a}$, where $Y_{2a}$ is —$C_{2-6}$alkylene, —$C_{3-6}$alkylene- which is interrupted by —O—, —S— or —NR$_b$—, monohydroxy-substituted —$C_{3-6}$alkylene-, cyclohexylene,

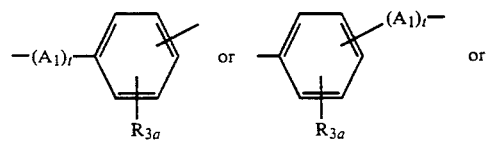

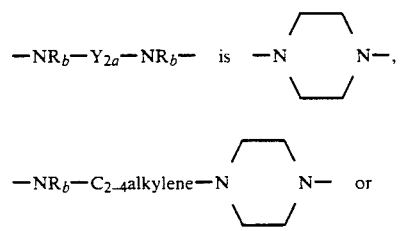

More preferably $Y_2$ is $Y_{2b}$, where $Y_{2b}$ is —$C_{2-4}$alkylene-, monohydroxy-substituted —$C_{3-4}$alkylene-,

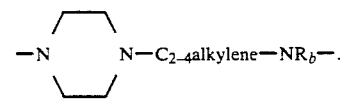

Any unsubstituted or substituted amino group as X is preferably —NR$_4$R$_5$ in which each R$_4$ and R$_5$ independently is hydrogen, $C_{1-6}$alkyl, $C_{1-6}$alkyl monosubstituted by hydroxy, halogen, cyano, $C_{1-4}$alkoxy, hydroxy-substituted $C_{1-4}$alkoxy, —COOH, —SO$_3$H or —O-SO$_3$H, cyclohexyl, phenyl or phenyl($C_{1-4}$alkyl) in which each phenyl ring is unsubstituted or substituted by one to three substituents selected from chlorine, $C_{1-4}$alkyl, $C_{1-4}$alkoxy, —COOH, —SO$_3$H and —NH$_2$, or —NR$_4$R$_5$ forms a pyrrolidine, piperidine, morpholine or piperazine ring, the second nitrogen atom of the piperazine ring being unsubstituted or substituted by methyl, ethyl, 2-hydroxyethyl or 2-aminoethyl.

R$_4$ and R$_5$ are preferably R$_{4a}$ and R$_{5a}$, where each R$_{4a}$ and R$_{5a}$ independently is hydrogen, $C_{1-4}$alkyl, $C_{1-4}$alkyl monosubstituted by chlorine, hydroxy, methoxy, —COOH, —SO$_3$H or —OSO$_3$H, cyclohexyl, phenyl or benzyl in which each phenyl ring is unsubstituted or substituted by one or two substituents selected from chlorine, methyl, ethyl, methoxy, ethoxy, —SO$_3$H and —NH$_2$, or —NR$_{4a}$R$_{5a}$ forms a piperidine, morpholine, piperazine or N-methylpiperazine ring.

More preferably R$_4$ and R$_5$ are R$_{4b}$ and R$_{5b}$, where each R$_{4b}$ and R$_{5b}$ independently is hydrogen, methyl, ethyl, $C_{2-3}$alkyl monosubstituted by hydroxy or —SO$_3$H, cyclohexyl, phenyl or sulphophenyl or —NR$_{4b}$R$_{5b}$ forms a morpholine ring.

Each X is preferably X$_a$, where each X$_a$ independently is fluorine, chlorine or —NR$_4$R$_5$; more preferably X$_b$ where each X$_b$ is chlorine or —NR$_{4a}$R$_{5a}$; most preferably each X is X$_c$ where each X$_c$ independently is —NR$_{4b}$R$_{5b}$.

In the compounds of formula I, X is preferably X$_a$ and $Y_2$ is preferably $Y_{2a}$.

Q is preferably Q$_a$, where Q$_a$ is the radical of a metal-free or metallised monoazo or disazo dye or of a dioxazine dye, especially of a triphendioxazine dye.

More preferably Q is Q$_b$, where Q$_b$ is one of the dyestuff groups (a) to (e),

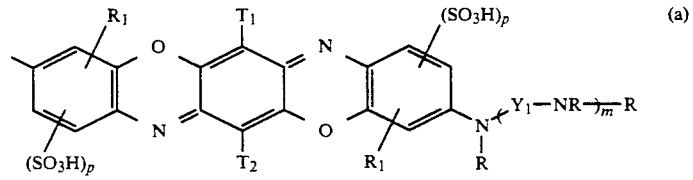

in which the symbols are as defined above,

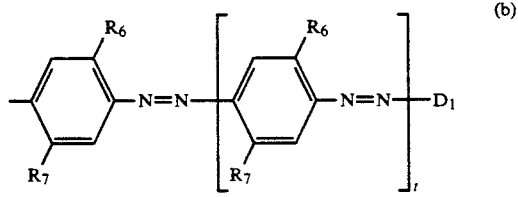

in which
each R$_6$ independently is hydrogen, $C_{1-4}$alkyl, $C_{1-4}$alkoxy, —NHCOC$_{1-4}$alkyl or —NHCONH$_2$,
each R$_7$ independently is hydrogen, $C_{1-4}$alkyl or $C_{1-4}$alkoxy,
t is 0 or 1, and
D$_1$ is

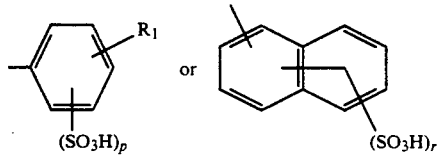

in which $R_1$ and p are as defined above, and r is 1, 2 or 3;

(c)

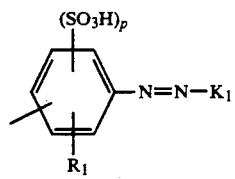

in which $R_1$ and p are as defined above, and $K_1$ is the radical of a coupling component having the formula

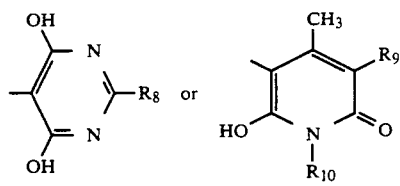

in which
$R_8$ is hydroxy or —NHCN,
$R_9$ is hydrogen, cyano, —CONH$_2$ or —CH$_2$SO$_3$H,
$R_{10}$ is hydrogen, $C_{1-4}$alkyl or —A$_2$—NR$_4$R$_5$,
$A_2$ is —$C_{2-4}$alkylene- or monohydroxy-substituted —$C_{3-4}$alkylene-, and
$R_4$ and $R_5$ are as defined above;

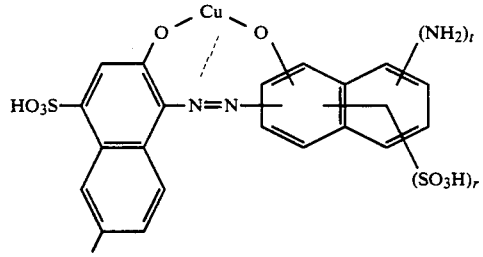

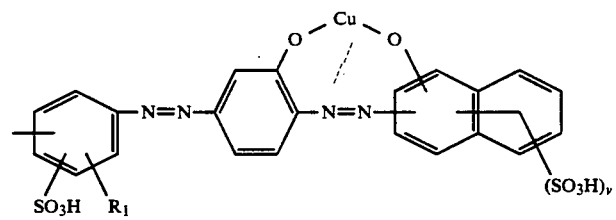

in which in the naphthyl ring of each group (d) and (e), —N=N— and —O— are attached to carbon atoms which are ortho to each other in the 1,2- or 2,1-positions,
t is 0 or 1,
r is 1, 2 or 3, and
v is 2 or 3, and $R_1$ is as defined above.
Most preferably Q is $Q_c$, where $Q_c$ is

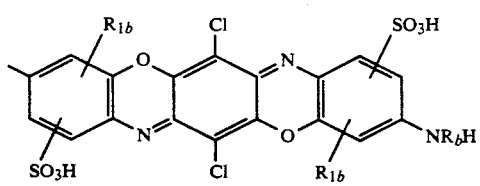

in which $R_b$ and each $R_{1b}$ are as defined above.
Z is preferably $Z_a$, where $Z_a$ is

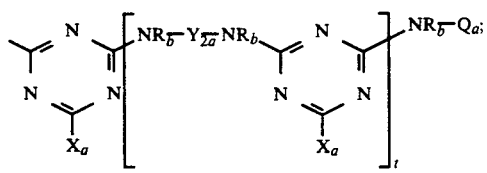

more preferably $Z_b$, where $Z_b$ is

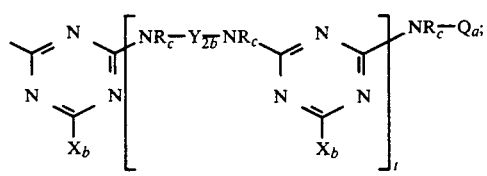

even more preferably $Z_c$, where $Z_c$ is $Z_b$ in which t is 0 and $Q_a$ is $Q_b$. Most preferably Z is $Z_d$, where $Z_d$ is

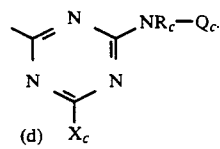

(d)

(e)

Preferred compounds of formula I correspond to formula Ia

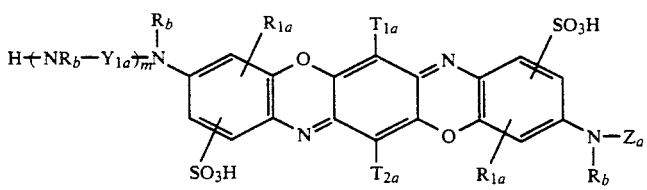

and salts thereof.

More preferred are compounds of formula Ia in which (1) each $T_{1a}$ and $T_{2a}$ is chlorine;
(2) $Y_{1a}$ is $Y_{1b}$;
(3) each $R_b$ independently is $R_c$;
(4) $Z_a$ is $Z_b$;
(5) m is 0.

Preferred compounds of (3) are those wherein $Y_{1a}$ is $Y_{1b}$.

Even more preferred compounds of formula I correspond to formula Ib

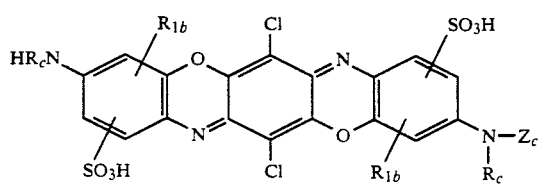

and salts thereof.

Most preferred are compounds of formula Ib in which (1) each $R_c$ is hydrogen;
(2) each $R_{1b}$ is hydrogen;
(3) $Z_c$ is $Z_d$.

Preferred compounds of (2) are those wherein each $R_c$ is hydrogen.

In the compounds of formulae I, Ia and Ib, any floating sulpho group on each terminal phenyl ring of the condensed ring system is preferably bound to a carbon atom which is ortho to the carbon atom to which the external amino group is attached.

The compounds of formula I are in free acid or salt form (including mixed salt forms). Preferably, each cation of a salt is independently a non-chromophoric cation. Such salt forms include salts of alkali metals, such as lithium, sodium and potassium, and unsubstituted or substituted ammonium salts, and mixed salts thereof. Substituted ammonium salts may be those in which the ammonium cation is derived from a primary, secondary or tertiary amine, and the following amines, for example may be suitable: mono-, di- or trimethyl-, -ethyl-, -propyl- or -butyl-amine; mono-, di- or triethanol-, -propanol- or isopropanol-amine; N-methyl-N-hydroxyethylamine, N-methyl-N,N-di-(hydroxyethyl)amine, N-ethyl-N-hydroxyethoxyethylamine, morpholine, piperidine, piperazine, N-hydroxyethylmorpholine, N-hydroxyethylpiperazine, N-aminoethylpiperazine; ethylenediamine, hexamethylenediamine; dimethylaminopropylamine, diethylaminopropylamine, diethylene glycol amine, diglycol amine and 3-methoxypropylamine. Also suitable as amines are polyglycol amines which may be obtained, for example, by reacting ammonia, alkyl- or hydroxyalkylamine with alkylene oxides.

The substituted ammonium ion may also be a quaternary ammonium ion which is derived from ammonium compounds which preferably contain one or two quaternary ammonium ions; examples which may be mentioned are: tetramethyl-, tetraethyl-, trimethylethyl-, dimethyl-di(2-hydroxypropyl)-, trimethylhydroxyethyl-, tetra-hydroxyethyl- and trimethylbenzyl-ammonium hydroxide.

The present invention further provides a process for the preparation of compounds of formula I and mixtures thereof comprising reacting one mole of a compound of formula II

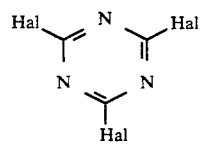

in which Hal is halogen, with one mole of a compound of formula III

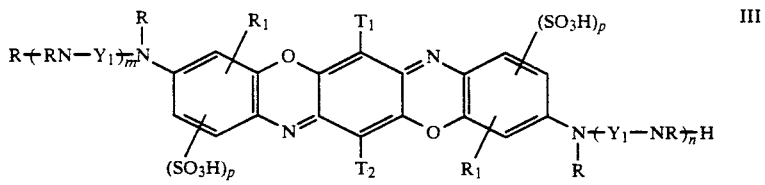

in which the symbols are as defined above, and one mole of a compound of formula IV $$HNR-Q \qquad \text{IV}$$

in which R and Q are as defined above, and optionally one mole of a compound of formula V $$H-X' \qquad \text{V}$$

in which X' is an unsubstituted or substituted amino group, in any desired order to obtain a compound of formula I in which t, in the group Z t is 0.

Compounds of formula I in which for the group Z, is 1 may be prepared in an analogous manner as described above but adding a further reaction step to introduce the group —NR—$Y_2$—NR— by reacting one mole of a cyanuric halide or one or two different appropriate mono- or dicondensation products thereof with ½ mole of a compound of formula VI

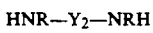
HNR—Y$_2$—NRH                                              VI in which R and Y$_2$ are as defined above.

The separate condensation reactions for the stepwise exchange of the halogen atoms on the triazine ring may be effected in accordance with known methods and take place under conditions which are conventional for the exchange of the first, second and third halogen atom on the triazine ring.

Preferably, introduction of a group X' is carried out as the last step in the reaction sequence.

The compounds of formulae III, IV, V and VI used as starting materials are either known or may be prepared in accordance with known methods using known starting compounds.

The compounds of formula I may be isolated in accordance with known methods, for example by precipitation from the reaction solution, for example with ethanol, filtering off and drying. Furthermore, a resultant compound of formula I may be used per se in the form of the solution obtained, or the solution can also be converted into a solid form by spray-drying.

When a compound of formula I is in salt form, the cation associated with the sulpho groups is not critical and may be any one of those non-chromophoric cations mentioned above but can be influenced in various manner depending on the process used in accordance with conventional methods. In particular, mixed salts may be produced.

The compounds according to the invention in the form of their water-soluble salts may be used for dyeing or printing hydroxy group- or nitrogen-containing organic substrates. They may be used, for example, for dyeing or printing fibres, filaments or textiles produced therefrom which consist of or contain natural or synthetic polyamides or natural or regenerated cellulose material, e.g. cotton, in accordance with known methods; cotton is preferably dyed by the exhaust process, for example, from a long or short liquor and at room temperature to boiling temperature.

Printing is effected by impregnation with a printing paste which is prepared by known methods.

The compounds of formula I can also be employed for dyeing or printing leather, preferably chrome-tanned types of leather, by known methods. In addition, they may be used in the production of inks according to known methods.

The compounds of formula I are especially suitable for dyeing or printing paper, e.g. for the production of mass-dyed, sized or unsized paper. They can also be used for dyeing paper by the dipping process or in the sizing press. Dyeing and printing take place by known methods. The dyeings and prints obtained (especially those on paper) have good fastness to use properties.

The compounds of formula I may also be used in the form of dyeing preparations. This form of application is preferred in particular when dyeing paper. The processing into stable liquid, preferably aqueous, concentrated dyeing preparations may take place in accordance with known methods, advantageously by dissolving in suitable solvents, optionally in the presence of an adjuvant, e.g. a hydrotropic compound or a stabiliser. Of particular advantage is the possibility of producing such stable aqueous-concentrated preparations in the course of dyestuff synthesis itself, without intermediate isolation of the dye.

Suitable hydrotropic assistants are for example, low molecular weight amides, lactones, alcohols, glycols and polyols, low molecular weight ethers and oxyalkylation products, as well as nitriles and esters. Preferred assistants are methanol, ethanol, propanol; ethylene-, propylene-, diethylene-, thiodiethylene- and dipropylene-glycol; butanediol; β-hydroxy-propionitrile, pentamethylene-glycol, ethylene-glycol-monoethyl- and -propyl-ether, ethylene-diglycol-monoethylether, triethylene-glycol-monobutylether, butylpolyglycol, formamide, dimethyl-formamide, pyrrolidone, N-methyl-pyrrolidone, glycol acetate, butyrolactone, urea and ε-caprolactam.

Due to the presence of a hydrotropic compound, the storage stability of the dyestuff preparation and the solubility of the dyestuff used can be further improved.

A suitable composition of a liquid preparation is as follows (parts are by weight):
- 100 parts of a compound of formula I in water-soluble salt form,
- 1–100, preferably 1–10, parts of an inorganic salt,
- 100–800 parts of water,
- 0–500 parts of one of the above-listed hydrotropic compounds.

Depending on the salt form, the liquid preparations may be suspensions or preferably true solutions. The preparations are stable and can be stored for a long period of time.

Similarly, the compounds of formula I can be processed in accordance with known manner into solid, preferably granulated dyeing preparations, advantageously by granulating, as described in British Patent Specification No. 1.241.053 A.

A suitable solid composition is as follows (parts are by weight):
- 100 parts of a compound of formula I in water-soluble salt form,
- 1–100, preferably 1–10, parts of an inorganic salt,
- 0–800 parts of a standardising agent (preferably non-ionic, such as starch, dextrin, sugar, grape sugar or urea).

The solid preparation may contain up to 10% residual moisture.

The compounds of formula I have good solubility properties dependent on the cation or cation mixture associated with the sulpho groups and are especially notable for their solubility in cold water. Furthermore, when producing sized or unsized paper, they hardly colour the waste water at all or only slightly. They do not mottle on paper, are substantially insensitive to filler and pH variations and have minimal inclination towards two-sided effects on paper.

The dyeings on paper have good light fastness; after a long-term exposure to light, the shade alters tone-in-tone. The dyed papers have good wet fastness properties to water, milk, fruit juices, sweetened mineral water and tonic water, and in addition have good alcohol fastness. The dyes have high substantivity, i.e. they are absorbed practically quantitatively, and thus show good build-up. They can be added to the paper pulp directly, i.e. without previous dissolution, as a dry powder or as granules, without any reduction in brilliance or colour yield. However, true solutions of the dyestuffs as given above are advantageously employed. They are stable, of low viscosity and can therefore be dosed well.

The dyed papers can be bleached perfectly both by oxidation and by reduction, which is important for the re-use of waste paper.

Production of the paper dyeings using the described dyes can also be effected in soft water. In addition, fibrous materials containing mechanical wood pulp can be dyed in good quality.

Furthermore, the dyeings and prints obtained on textile material, and particularly those on textiles containing or consisting of cellulose, exhibit good light and wet fastness properties.

The wet fastness properties of these dyeings or prints obtained with compounds of formula I and especially with those in which t, in a group Z, is 1, may be notably improved by a special resin aftertreatment with selected auxiliaries. Particularly, this treatment gives improved wash fastness properties, allowing repeated washing at high temperatures.

Suitable for applying to the dyed or printed substrate is a fixing agent comprising a precondensate or mixture of either (A) the product of reacting a mono- or polyfunctional primary or secondary amine with cyanamide, dicyandiamide, guanidine or biguanide; or ammonia with cyanamide or dicyandiamide, said product (A) containing reactive hydrogen atoms bound to nitrogen, or (B) a quaternary polyalkylene polyamine with (C) an N-methylol derivative of a urea, melamine, guanamine, triazinone, urone, carbamate or acid amide, optionally together with (D) a catalyst for the crosslinking of N-methylol compounds of the type (C) above.

Details concerning the fixing agent as a combination of (A), (C) and (D) and its use are described in British Patent Application No. 2,070,006 A; details concerning the combination (B), (C) and (D) are described in British Patent Application No. 2,084,597 A.

The following examples illustrate the invention. All parts and percentages are by weight and all temperatures are given in degrees celsius, unless indicated to the contrary.

EXAMPLE 1

10 Parts of cyanuric chloride are stirred well into 100 parts of water and 100 parts of ice. To the suspension, thus obtained a solution of 27 parts of 2,9-diamino-6,13-dichlorotriphendioxazinedisulphonic acid in 200 parts of water and adjusted to pH 7 by the addition of sodium hydroxide solution is added dropwise. During the condensation, the pH is maintained at 6–7 by adding sodium hydroxide solution and stirring is effected for at least three hours at 15°–18°. After this time, the monocondensation is completed. It is evident from thin layer chromatogram which does not show a red zone that the starting compound has only been monoacylated.

In a second step, a further 27 parts of 2,9-diamino-6,13-dichlorotriphenedioxazine disulphonic acid which have been dissolved in 200 parts of water and adjusted to pH 7 are added. The temperature is raised to 80° and the pH is maintained at 6–7 with sodium hydroxide solution. After four hours, the dicondensation is completed. 50 Parts of diethanolamine are subsequently added and the temperature is elevated to 98°. After one further hour, from thin layer chomatrogram it can be seen that the reaction has been completed. The blue dyestuff solution thus produced is cooled to 40°–50°, and the dyestuff is precipitated by adding 1000 parts of ethanol. It is filtered by suction and dried. The dyestuff thus obtained having the formula

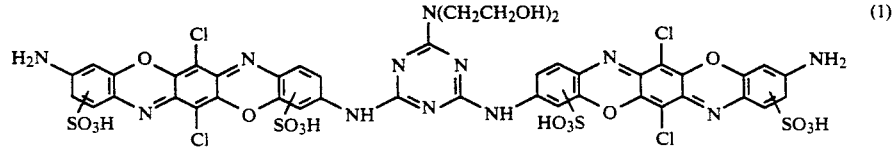

is a blue powder which is well soluble in water and dyes paper a brilliant blue shade. The properties of these paper dyeings with respect to wet fastnesses and backwater colouration are good, their light fastness is notably good.

In formula (1) each floating —$SO_3H$ group is preferably in one of the ortho positions relative to the carbon atom of the phenyl ring to which the external amino group is attached.

EXAMPLES 2–24

By analogy with the method described in Example 1, using appropriate starting compounds, further compounds of formula I may be prepared. They correspond to formula A

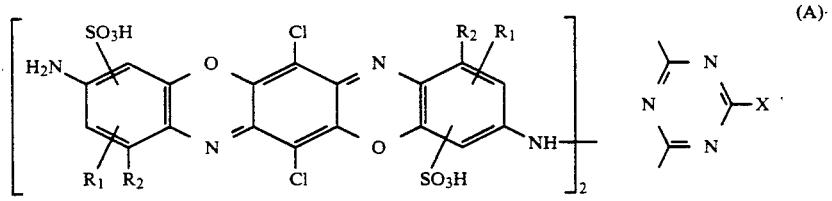

in which the symbols are as defined in the following Table 1.

In case where in formula A $R_1$ is hydrogen, the floating —$SO_3H$ group on each terminal phenyl ring may be in one of the ortho positions relative to the carbon atom to which the external amino group is attached. Similarly, in case where $R_1$ is other than hydrogen, $R_1$ and —$SO_3H$, respectively, can be attached to each of these ortho positions. This is due to the directions possible for the ring closure reaction.

The paper dyeings obtained with the dyestuffs listed in Table 1 are all brilliant blue. They show good properties with respect to backwater colouration and light- and wet-fastnesses.

TABLE 1

| Ex. No. | R₁ | R₂ | X |
|---|---|---|---|
| 2 | H | OCH₃ | —N(CH₂CH₂OH)₂ |
| 3 | H | COOH | " |
| 4 | CH₃ | H | " |
| 5 | Cl | H | " |
| 6 | H | H | —NHCH₂CH₂OH |
| 7 | H | H | Cl |
| 8 | H | H | —NHCH₂CH₂SO₃H |
| 9 | H | H | —NH₂ |
| 10 | H | H | —NH—C₆H₁₁ (cyclohexyl) |
| 11 | Cl | H | —N(CH₃)(C₆H₅) |
| 12 | H | H | —NH—C₆H₄—SO₃H (para) |
| 13 | H | H | —NH—C₆H₄—SO₃H (meta) |
| 14 | H | H | —NHCH₂CH(OH)CH₃ |
| 15 | H | OCH₃ | —NHCH₂CH₂OH |
| 16 | H | H | —N(piperazinyl)—CH₂CH₂OH |
| 17 | H | H | —N(CH₃)CH₂CH₂OH |
| 18 | H | H | —NHCH₂CH₂OCH₂CH₂OH |
| 19 | H | H | —N[CH₂CH(OH)CH₃]₂ |
| 20 | H | H | —NHCH₂COOH |
| 21 | H | H | —N(morpholinyl) |
| 22 | H | COOH | " |
| 23 | H | H | —N(piperazinyl)NH |
| 24 | H | H | —N(piperazinyl)N—CH₃ |

EXAMPLE 25

10 Parts of cyanuric chloride are reacted with 27 parts of 2,9-diamino-6,13-dichlorotriphendioxazinedisulphonic acid in accordance with the method described in Example 1 to form a monocondensate. Subsequently, 2.9 parts of 1,4-diaminobenzene are added and the temperature is raised to 50°–60°. The pH is kept at 7–8 by the addition of sodium carbonate. After approximately four hours the reaction is complete. 50 Parts of diethanolamine are then added. The temperature is elevated to 95° and the mixture is stirred for one further hour. The resultant blue dyestuff solution is then cooled to ca. 30°–40°, and 1000 parts of acetone are added. The dyestuff precipitates and is filtered off and dried; it corresponds, in free acid form, to the formula

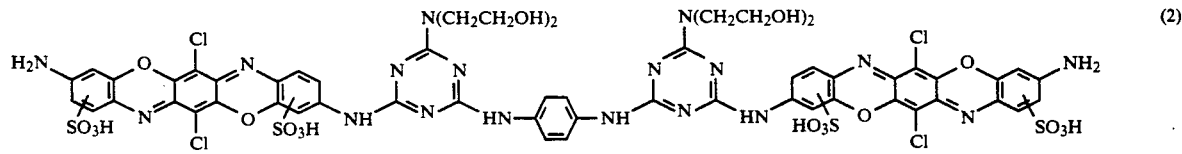

(2)

and is well soluble in water. This dyestuff dyes paper or cotton a brilliant blue shade. The fastness properties of these dyeings with respect to backwater colouration and wet fastnesses are perfect, and their light fastness is excellent.

EXAMPLES 26 TO 40

By analogy with the method described in Example 25, using appropriate starting compounds, further compounds of formula I may be prepared. They correspond to formula B

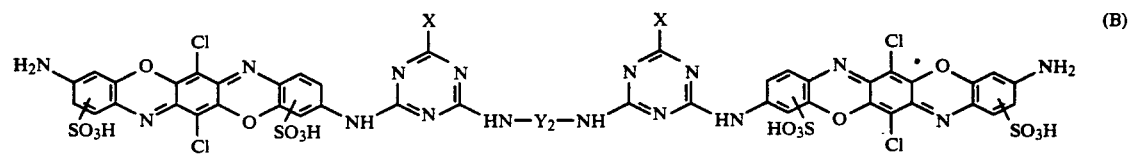

(B)

in which the symbols are as defined in the following Table 2. The paper or cotton dyeings obtained with the dyestuffs listed in Table 2 are all brilliant blue and show perfect fastness properties.

TABLE 2-continued

| Ex. No. | Compounds of formula B -NH-Y₂-NH- | each X |
|---|---|---|
| 26 | -HN-⌬-NH- | Cl |
| 27 | " | -NHCH₂CH₂OH |
| 28 | -HN-⌬-NH- (meta) | " |
| 29 | " | Cl |
| 30 | " | -N(CH₂CH₂OH)₂ |
| 31 | -HNCH₂CH₂NH- | " |
| 32 | " | Cl |
| 33 | -HNCHCH₂NH-<br>      \|<br>      CH₃ | Cl |
| 34 | " | -NHCH₂CH₂OH |
| 35 | -HNCH₂CHCH₂NH-<br>         \|<br>         OH | Cl |
| 36 | " | -N(CH₂CH₂OH)₂ |
| 37 | -HN(CH₂)₃N-<br>       \|<br>       CH₃ | Cl |
| 38 | " | -N(CH₂CH₂OH)₂ |

In a compound of formula (2) as well as in a compound of formula B, each floating —SO₃H group is preferably in an ortho position relative to the carbon atom of the phenyl ring to which the external amino group is attached.

TABLE 2-continued

| Ex. No. | Compounds of formula B -NH-Y₂-NH- | each X |
|---|---|---|
| 39 | —N⌬N— (piperazine) | " |
| 40 | " | Cl |

—NH—

EXAMPLE 41

By analogy with the method described in Example 1 but using, after the monocondensation has been completed, 28 parts of 2,9-diamino-4,11-dimethoxy-6,13-dichlorotriphendioxazinedisulphonic acid instead of 27 parts of 2,9-diamino-6,13-dichlorotriphenedioxazine disulphonic acid and replacing the last chloro substituent of the triazine with the corresponding amount of diethanolamine, the dyestuff of the formula

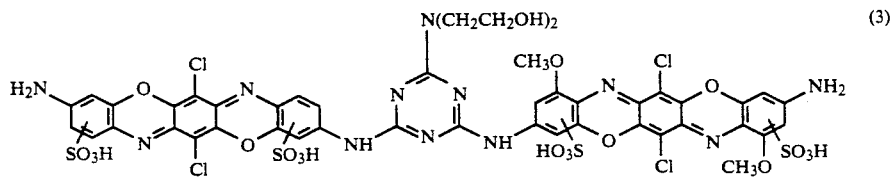

(3)

is obtained which dyes paper a brilliant blue shade. These paper dyeings show good properties with respect to backwater colouration and wet fastnesses and have very good light fastness properties.

EXAMPLES 42 TO 61

By analogy with the method described in Example 41, using appropriate starting compounds, further compounds of formula I may be prepared containing different chromophoric parts. They correspond to formula C

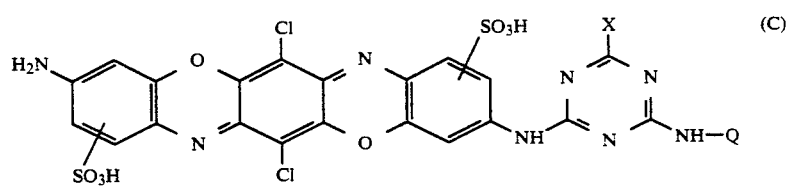

(C)

in which the symbols are as defined in the following Table 3. In the last column of Table 3 the shade on paper is given. The paper dyeings thus obtained show notably good light fastness and their properties with respect to backwater colouration and wet fastnesses are good.

In a compound of formula (3) and in a compound of formula C listed in Table 3, each floating —SO₃H group is preferably in an ortho position relative to the carbon atom of the phenyl ring to which the external amino group is attached.

TABLE 3

Compounds of formula C

| Ex. No. | —NH—Q | X | shade on paper |
|---|---|---|---|
| 42 | —HN(CH₂)₃NH— [phenoxazine structure with Cl, SO₃H, and —NH(CH₂)₃NH₂ substituents] | —N(CH₂CH₂OH)₂ | blue |
| 43 | " | —NHCH₂CH₂OH | " |
| 44 | " | —NH₂ | " |
| 45 | [structure: —HN—phenyl(OCH₃)—N=N—naphthyl(SO₃H)(SO₃H)] | —N(CH₂CH₂OH)₂ | greenish-olive |
| 46 | [structure: —NH—phenyl(SO₃H)—N=N—pyridone with CH₃, HO, NH, =O] | " | greenish-olive |
| 47 | [structure: —HN—phenyl(SO₃H)—N=N—pyridone with CH₃, HO, N-CH₂CH₃, =O] | " | greenish-olive |
| 48 | [structure: NH—phenyl(SO₃H)—N=N—pyridone with CH₃, HO, N-CH₂CH₂N(C₂H₅)₂, =O] | —NHCH₂CH₂OH | greenish-olive |
| 49 | [structure: —HN—phenyl(OCH₃)—N=N—phenyl(SO₃H)] | —NHCH₂CH₂OH | bluish-olive |
| 50 | " | —N(CH₂CH₂OH)₂ | bluish-olive |
| 51 | [structure: —HN—phenyl—N=N—pyrimidine(OH)(OH)—NHCN] | " | bluish-olive |
| 52 | " | Cl | bluish-olive |
| 53 | " | —NHCH₂CH₂SO₃H | bluish-olive |

TABLE 3-continued

Compounds of formula C

| Ex. No. | —NH—Q | X | shade on paper |
|---|---|---|---|
| 54 | " | 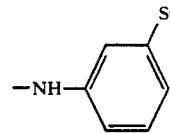 —NH—⟨⟩—SO₃H (meta) | bluish-olive |
| 55 | 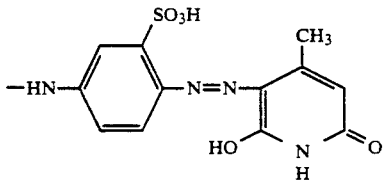 | " | bluish-olive |
| 56 | 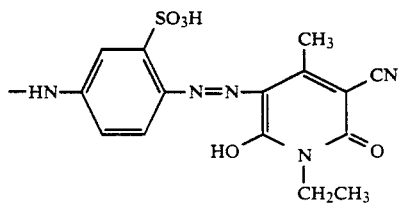 | —NH—⟨⟩ | bluish-olive |
| 57 | 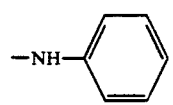 | —NHCH₂CH₂OH | bluish-olive |
| 58 | 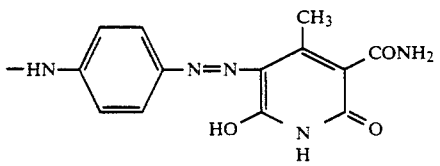 | —N(CH₂CH₂OH)₂ | bluish-olive |
| 59 | " | 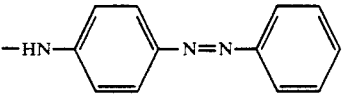 —NH—⟨⟩—SO₃H | bluish-olive |
| 60 |  | —N(CH₂CH₂OH)₂ | blue |
| 61 | 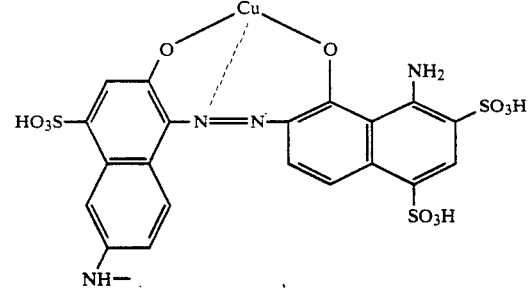 | " | " |

In accordance with the preparation method as described in Example 1 or 25, the compounds of Examples 1 to 61 are obtained in sodium salt form or, depending on the amine used for replacing the last chloro substituent on the triazine ring to introduce X, in mixed sodium/mono- or di-ethanolammonium salt form. They may, depending on the reaction and isolation conditions or by reacting the sodium salts or mixed sodium/ammonium salts in accordance with known methods, also be obtained in free acid form or in other salt forms, for example those salt forms containing one or more cations indicated in the description above.

Each compound of Examples 1 to 61 is obtained as a mixture of isomers with respect to the position of the sulpho groups and any $R_1$ relative to the sulpho group of the condensed ring system. Such a mixture normally need not be separated into individual isomers due to the fact that the position of the sulpho group whether it is in one ortho position or in the other, does not affect the dyeing properties of each compound; but separation into individual isomers could be done, if necessary, by conventional means, for example by thin layer chromatography.

In the following examples some liquid-aqueous dyeing preparations of the compounds as exemplified are illustrated.

EXAMPLE 62

35 Parts of the dyestuff prepared according to Example 1 as a moist presscake are stirred into 1400 parts of water, and 375 parts of urea are added. A solution is produced by heating to 40°. This solution is stable in storage for a long period of time, i.e. there is no precipitation either in the cold or in the heat.

EXAMPLE 63

Using the method of Example 1, but treating the reaction solution with hydrochloric acid to make it strongly acid, instead of treating it with ethanol following the third condensation step, the dyestuff of formula (1) precipitates in free acid form. The resultant presscake is dissolved in 300 parts of water and 100 parts of diethanolamine. A stable solution of the dyestuff of Example 1, which is ready for use, is formed in the form of the diethanolamine salt.

EXAMPLE 64

By using 20 parts of lithium monohydrate, instead of the diethanolamine in Example 63, a stable concentrated solution of the dyestuff in form of the lithium salt is similarly obtained.

Analogously to the method described in Examples 62 to 64, the dyestuffs of Examples 2-61 can be used in place of that of Example 1, to form the appropriate salt forms and produce liquid-aqueous dyeing preparations having high stability in storage.

In the following examples the application of the compounds according to the invention and their liquid-aqueous dyeing preparations are illustrated. Percentage figures for components of a dyebath or treatment bath are based on the dry weight of substrate.

APPLICATION EXAMPLE A

70 Parts of chemically bleached sulphite cellulose of pinewood and 30 parts of chemically bleached sulphite cellulose of birchwood are ground in a Hollander in 2000 parts of water. 0.2 Parts of the dyestuff of Example 1 are sprinkled into this mass, or 1.0 part of the liquid dyestuff preparation according to Example 62 or 63 is added. After mixing for 20 minutes, paper is produced therefrom. The absorbent paper thus obtained is dyed brilliant blue. The waste water is practically colourless.

APPLICATION EXAMPLE B 0.6 Parts of the dyestuff powder of Example 1 are dissolved in 100 parts of hot water and cooled to room temperature. The solution is added to 100 parts of chemically bleached sulphite cellulose, which have been ground in a Hollander in 2000 parts of water. After thorough mixing for 15 minutes, sizing takes place in the usual way with rosin size and aluminium sulphate. Paper which is produced from this material has a brilliant blue shade and possesses good properties with respect to waste water colouration and wet fastnesses, as well as notably good light fastness.

APPLICATION EXAMPLE C

An absorbent length of unsized paper is drawn through a dyestuff solution of the following composition at 40°–50°:

0.6 parts of the dyestuff of Example 1
0.4 parts of starch and
99.0 parts of water.

The excess dyestuff solution is squeezed out through two rollers. The dried length of paper is dyed brilliant blue.

Similarly, the dyestuffs of Examples 2 to 61 or a liquid-aqueous dyeing preparation thereof may be used to dye paper in accordance with the method described in Application Examples A to C. The paper dyeings thus obtained have a blue to olive shade and show good general fastness properties.

APPLICATION EXAMPLE D

50 Parts of bleached sulphite cellulose of pinewood and 50 parts of bleached beech cellulose [grinding degree 30° SR*)] are mixed together with 0.6 parts of the dyestuff of Example 1 in water (pH 4, water hardness 10° dH). After 16 minutes, sheet formation takes place. The paper is dyed in an intensively brilliant blue shade. A dyeing at pH 7 on the other hand shows no variation in depth or shade.
*) °SR = Schopper-Riegler degree

APPLICATION EXAMPLE E

100 Parts of intermediately-dried chrome suede leather are drummed for one hour at 50° in a vat containing a bath of 400 parts of water, 2 parts of 25% ammonium hydroxide solution and 0.2 parts of a commercial wetting agent. The bath is subsequently drained. 400 parts of water of 60° and 1 part of 25% ammonium hydroxide solution are added to the drummed, still moist chrome suede leather. After adding 5 parts of the dyestuff of Example 1, dissolved in 200 parts of water, dyeing is effected for 90 minutes at 60°. 50 Parts of a 8% formic acid are then slowly added so as to make the pH acidic. Treatment is effected for a further 30 minutes. Finally, the leather is rinsed, dried and finished in the usual way. The blue leather dyeing thus obtained is evenly dyed.

The dyestuffs of Examples 2–61 may also be used for dyeing leather analogously to the method described in Application Example E.

APPLICATION EXAMPLE F

100 Parts of pre-moistened cotton fabric are added at 30° to a dyebath consisting of 3000 parts of demineralised water, 2 parts of sodium carbonate and 1 part of the dyestuff of Example 1. After adding 10 parts of Glauber's salt, the bath is heated to boiling temperature over the course of 30 minutes, whereby during this heating process, a further 10 parts of Glauber's salt is added respectively at 50° and again at 70°. Dyeing then continues for a further 15 minutes at boiling temperature, and 10 parts of Glauber's salt are finally added. The dyebath is then allowed to cool. At 50°, the dyed fabric is removed from the liquor, rinsed with water and dried at 60°. A blue cotton dyeing with good fastness properties is obtained.

Similarly, the dyestuffs of Examples 2-61 may be used for dyeing cotton analogously to the method described in Application Example F.

APPLICATION EXAMPLE G 0.1 Part of the dyestuff of Example 26 is dissolved in 200 parts of water at 60°. 10 Parts of cotton, 16 parts of Glauber's salt and 4 parts of sodium carbonate are subsequently added to the dyebath. The temperature is raised to 98° over the course of 45 minutes.

Dyeing is continued for one hour at 98°. During dyeing, the water that evaporates is continuously replaced. The dyed fabric is then removed from the liquor and is rinsed with running cold and then hot water. The cotton dyeing is washed at the boil for 20 minutes in 500 parts of demineralised water in the presence of 0.5 parts of Marseilles soap. After being rinsed, a brilliant blue cotton dyeing is obtained showing good properties with respect to light fastness, wet fastnesses and fastness to chlorine.

APPLICATION EXAMPLE H 0.1 Part of the dyestuff of Example 25 is dissolved in 200 parts of demineralised water. The dyebath is heated to 40°-50°, then 10 parts of cotton cretonne (bleached) are added. Within 30 minutes the temperature is elevated to 98°. At this temperature 1 part and after 10 minutes further 2 parts of Glauber's salt (calcined) are added, and the dyeing temperature is kept at 98° for 35 minutes. Finally, the dyebath is cooled to 80° within 15 minutes. Water that evaporates during the dyeing process is continuously replaced by demineralised water at 98°. The dyed fabric is rinsed with running cold water for 5 minutes, centrifuged and dried at 80°. The resultant cotton dyeing is brilliant blue and shows notably good light- and wet-fastness properties.

APPLICATION EXAMPLE I

A blue standard depth dyeing on cotton fabric obtained with the dyestuff of Example 25 in accordance with the method described in Application Example H is padded with an aqueous solution containing 100 g/l of a fixing agent which is a mixture given below and is squeezed out to give a pick-up of about 80%. The fabric is then shock-dried on a tension frame at 175°-180° in such a way that the cross-linking time of the dry fabric is 30-45 seconds at this temperature.

The fixing agent is a reaction product (at 70° during three hours) of (A) 68.5 parts of a spray-dried solution at pH 7.5 which has been obtained by condensation of 103 parts of dethylenetriamine with 84 parts of dicyandiamide at 110° (raised to 160°) and subsequent stepwise neutralisation with 44.6% sulphuric acid with the addition of ice, and (C) 457 parts of a 50% solution of dimethyloldihydroxyethylene urea heated to 70°, to which 23 parts of dicyandiamide are added to use as a stabilising agent. This product may be employed as such or together with a catalyst to increase the cross-linking, e.g., magnesium chloride.

The brilliant blue cotton dyeing fixed in such a way exhibits excellent wash fastness and withstands repeated washing at 60° and even a washing at the boil.

APPLICATION EXAMPLE J

Instead of the fixing agent used in Application Example I it is also possible to employ the water-soluble pre-condensate which is obtained by reacting (B) 100 parts of a 50% aqueous solution of the reaction product of epichlorohydrin and dimethylamine with (C) 150 parts of a 50% aqueous solution of dimethyloldihydroxyethylene urea in the presence of (D) 20 parts of magnesium chloride.hexahydrate at 70° during 30 minutes.

The resultant brilliant blue cotton dyeing aftertreated in such a way shows excellent wash-fastness. At the same time a significant improvement of crease-resistance is obtained.

What is claimed is:

1. A compound of the formula

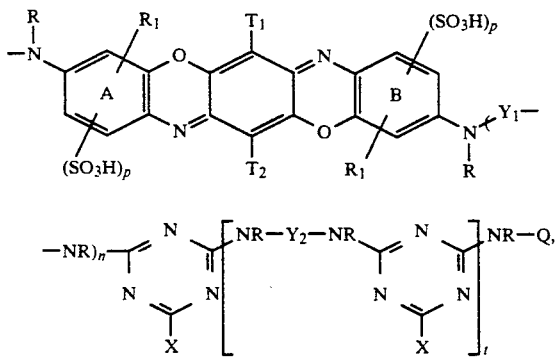

or a salt thereof, wherein Q is a chromophoric radical of an azo, formazan, anthraquinone, phthalocyanine or dioxazine dye, each R is independently hydrogen, $C_{1-6}$-alkyl or $C_{1-6}$alkyl monosubstituted by halo, cyano, hydroxy, $C_{1-4}$-alkoxy, —COOH, —$SO_3H$ or —$OSO_3H$, each of $T_1$ and $T_2$ is independently hydrogen; chloro; bromo; $C_{1-4}$alkyl; $C_{1-4}$alkoxy; $C_{1-4}$alkyl or $C_{1-4}$-alkoxy monosubstituted by chloro, methoxy, ethoxy or —$OSO_3H$; phenyl; phenoxy; or phenyl or phenoxy substituted by one or two substituents selected from chloro, bromo, methyl, ethyl, methoxy and ethoxy, each X is independently halo or —$NR_4R_5$, wherein each of $R_4$ and $R_5$ is independently hydrogen; $C_{1-6}$alkyl; $C_{1-6}$alkyl monosubstituted by hydroxy, halo, cyano, $C_{1-4}$alkoxy, $C_{1-4}$hydroxyalkoxy, —COOH, —$SO_3H$ or —$OSO_3H$; cyclohexyl; phenyl; phenyl substituted by one to three substituents selected from chloro, $C_{1-4}$alkyl, $C_{1-4}$alkoxy, —COOH, —$SO_3H$ and —$NH_2$; phenyl($C_{1-4}$-alkyl) or phenyl($C_{1-4}$alkyl) the phenyl ring of which is substituted by one to three substituents selected from chloro, $C_{1-4}$alkyl, $C_{1-4}$alkoxy, —COOH, —$SO_3H$ and —$NH_2$, or —NR$_4$R$_5$ is pyrrolidino, piperidino, morpholino, piperazino or N'-R$_9$-piperazino, wherein R$_9$ is methyl, ethyl, 2-hydroxyethyl or 2-aminoethyl, each Y$_1$ is independently linear or branched C$_{2-6}$alkylene; linear or branched C$_{3-6}$alkylene monosubstituted or disubstituted by hydroxy; linear or branched C$_{3-6}$alkylene interrupted by —O—, —S— or —NR—; cyclohexylene or cyclohexylene substituted by one to three methyl groups;

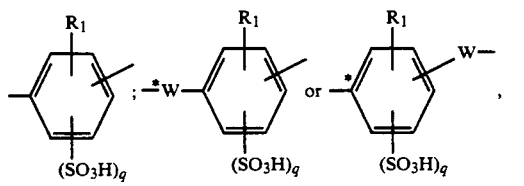

wherein

W is linear or branched C$_{1-4}$alkylene, the * denotes the carbon atoms attached to the nitrogen atom attached to Ring A or Ring B, and R is as defined above, each —NR—Y$_1$—NR— is independently

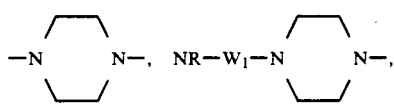

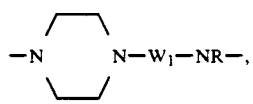

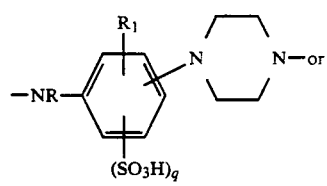

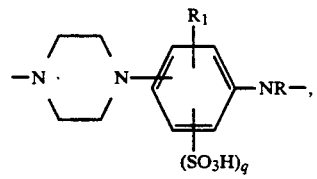

wherein

R is as defined above,

Y$_2$ is linear or branched C$_{2-6}$alkylene; linear or branched C$_{2-6}$alkylene interrupted by —O—, —S— or —NR—; linear or branched C$_{3-6}$alkylene monosubstituted or disubstituted by hydroxy; cyclohexylene; cyclohexylene substituted by one to three methyl groups;

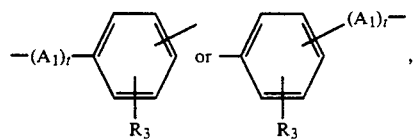

wherein

A$_1$ is linear or branched C$_{1-4}$alkylene,

R$_3$ is hydrogen, C$_{1-4}$alkyl, C$_{1-4}$alkoxy, chloro, —COOH or —SO$_3$H, and R is as defined above, or

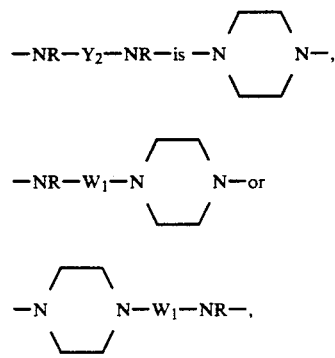

wherein R is as defined above, each of m and n is independently 0 or 1, and each p is independently 0, 1 or 2, wherein each R$_1$ is independently hydrogen, halo, C$_{1-4}$alkyl, C$_{1-4}$alkoxy or —COOH, each W$_1$ is independently linear or branched C$_{2-4}$alkylene, each q is independently 0 or 1, and each t is independently 0 or 1, wherein each halo is independently fluoro, chloro or bromo, with the proviso that the compound contains at least one sulfo group, or a mixture thereof.

2. A compound according to claim 1, or a salt thereof, wherein any sulfo group on Ring A is ortho to the —NR— radical attached to said ring and any sulfo group on Ring B is ortho to the —NR— radical attached to said ring, or a mixture thereof.

3. A compound according to claim 1, or a salt thereof, wherein each R is independently hydrogen, C$_{1-4}$alkyl or C$_{1-4}$alkyl monosubstituted by chloro, cyano, hydroxy, methoxy, —COOH, —SO$_3$H or —O-SO$_3$H, or a mixture thereof.

4. A compound according to claim 1, or a salt thereof, wherein each R$_1$ is independently hydrogen, chloro, methyl, ethyl, methoxy, ethoxy or —COOH, or a mixture thereof.

5. A compound according to claim 1, or a salt thereof, wherein each of T$_1$ and T$_2$ is independently hydrogen, chloro, bromo, methyl, ethyl, methoxy, ethoxy, phenyl, phenoxy or phenyl or phenoxy substituted by one or two substituents selected from chloro, bromo, methyl, ethyl, methoxy and ethoxy, or a mixture thereof.

6. A compound according to claim 1, or a salt thereof, wherein each $Y_1$ is independently linear or branched $C_{2-6}$alkylene; linear or branched $C_{3-6}$alkylene monosubstituted by hydroxy; linear or branched $C_{3-6}$alkylene interrupted by —O—, —S— or —$NR_b$—; cyclohexylene;

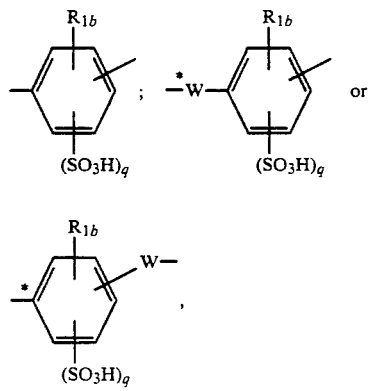

wherein $R_{1b}$ is hydrogen, chloro, methyl, methoxy or —COOH,

W is linear or branched $C_{1-4}$alkylene, and the * denotes the carbon atom attached to the nitrogen atom attached to Ring A or Ring B, or each —NR—$Y_1$—NR— is independently is

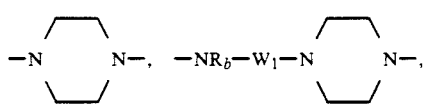

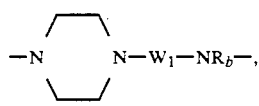

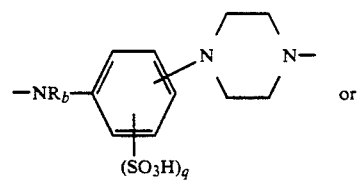

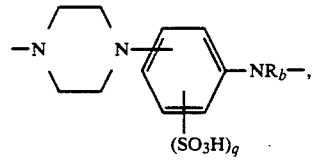

wherein $W_1$ is linear or branched $C_{2-4}$alkylene, wherein each $R_b$ is independently hydrogen, methyl, ethyl or $C_{2-3}$alkyl monosubstituted by hydroxy or methoxy, and each q is independently 0 or 1, or a mixture thereof.

7. A compound according to claim 1, or a salt thereof, wherein $Y_2$ is linear or branched $C_{2-6}$alkylene; linear or branched $C_{3-6}$alkylene interrupted by —O—, —S— or —$NR_b$—; linear or branched $C_{3-6}$alkylene monosubstituted by hydroxy; cyclohexylene;

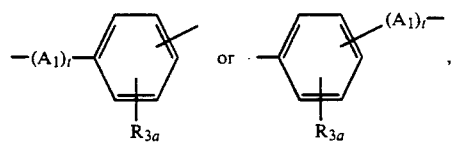

wherein $A_1$ is linear or branched $C_{1-4}$alkylene, $R_{3a}$ is hydrogen, chloro, methyl, methoxy, —COOH or —SO$_3$H, and t is 0 or 1, or

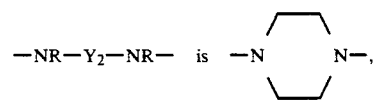

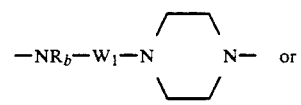

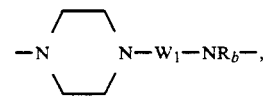

wherein $W_1$ is linear or branched $C_{2-4}$alkylene, wherein each $R_b$ is independently hydrogen, methyl, ethyl or $C_{2-3}$alkyl monosubstituted by hydroxy or methoxy, or a mixture thereof.

8. A compound according to claim 7, or a salt thereof, wherein each X is independently fluoro, chloro or —NR$_4$R$_5$, wherein each of R$_4$ and R$_5$ is independently hydrogen; $C_{1-6}$alkyl; $C_{1-6}$alkyl monosubstituted by hydroxy, halo, cyano, $C_{1-4}$alkoxy, $C_{1-4}$hydroxyalkoxy, —COOH, —SO$_3$H or —OSO$_3$H; cyclohexyl; phenyl; phenyl substituted by one to three substituents selected from chloro, $C_{1-4}$alkyl, $C_{1-4}$alkoxy, —COOH, —SO$_3$H and —NH$_2$; phenyl($C_{1-4}$alkyl) or phenyl($C_{1-4}$alkyl) the phenyl ring of which is substituted by one to three substituents selected from chloro, $C_{1-4}$alkyl, $C_{1-4}$alkoxy, —COOH, —SO$_3$H and —NH$_2$, or —NR$_4$R$_5$ is pyrrolidino, piperidino, morpholino, piperazino or N'-R$_9$-piperazino, wherein R$_9$ is methyl, ethyl, 2-hydroxyethyl or 2-aminoethyl, or a mixture thereof.

9. A compound according to claim 1 having the formula

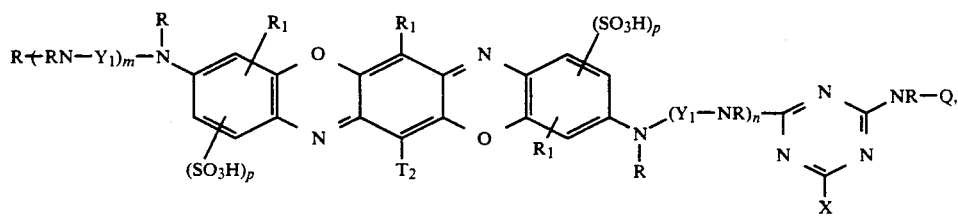

or a salt thereof, or a mixture thereof.

10. A compound according to claim 1 having the formula

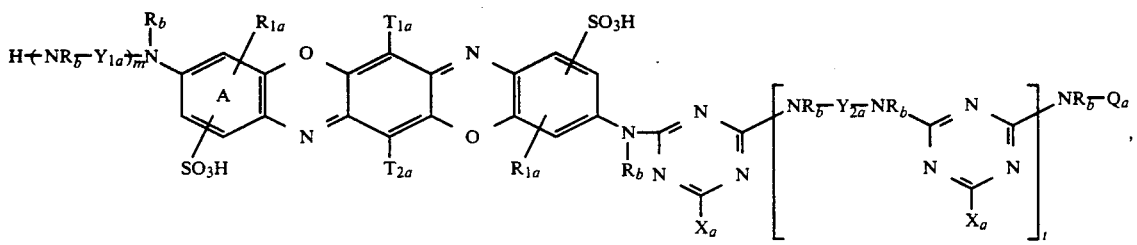

or a salt thereof,
wherein $Q_a$ is a chromophoric radical of a metal-free or metallized monoazo or disazo dye or of a dioxazine dye, each $R_b$ is independently hydrogen, methyl, ethyl or $C_{2-3}$alkyl monosubstituted by hydroxy or methoxy, each $R_{1a}$ is independently hydrogen, chloro, methyl, ethyl, methoxy, ethoxy or —COOH, each of $T_{1a}$ and $T_{2a}$ is independently hydrogen, chloro, bromo, methyl, ethyl, methoxy, ethoxy, phenyl, phenoxy or phenyl or phenoxy substituted by one or two substituents selected from chloro, bromo, methyl, ethyl, methoxy and ethoxy, each $X_a$ is independently fluoro, chloro or —NR$_4$R$_5$, wherein each of $R_4$ and $R_5$ is independently hydrogen; $C_{1-6}$alkyl; $C_{1-6}$alkyl monosubstituted by hydroxy, halo, cyano, $C_{1-4}$alkoxy, $C_{1-4}$hydroxyalkoxy, —COOH, —SO$_3$H or —OSO$_3$H; cyclohexyl; phenyl; phenyl substituted by one to three substituents selected from chloro, $C_{1-4}$alkyl, $C_{1-4}$alkoxy, —COOH, —SO$_3$H and —NH$_2$; phenyl($C_{1-4}$alkyl) or phenyl($C_{1-4}$-alkyl) the phenyl ring of which is substituted by one to three substituents selected from chloro, $C_{1-4}$alkyl, $C_{1-4}$alkoxy, —COOH, —SO$_3$H and —NH$_2$, or —NR$_4$R$_5$ is pyrrolidino, piperidino, morpholino, piperazino or N'-R$_9$-piperazino,
wherein $R_9$ is methyl, ethyl, 2-hydroxyethyl or 2-aminoethyl, $Y_{1a}$ is linear or branched $C_{2-6}$alkylene; linear or branched $C_{3-6}$alkylene monosubstituted by hydroxy; linear or branched $C_{3-6}$alkylene interrupted by —O—, —S— or —NR$_b$—; cyclohexylene;

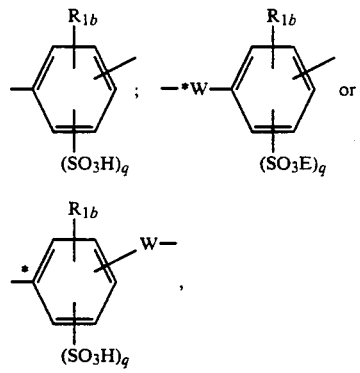

wherein $R_{1b}$ is hydrogen, chloro, methyl, methoxy or —COOH,

W is linear or branched $C_{1-4}$alkylene, and
the * denotes the carbon atom attached to the nitrogen atom attached to Ring A, or
—NR$_b$—Y$_{1a}$—NR$_b$— is

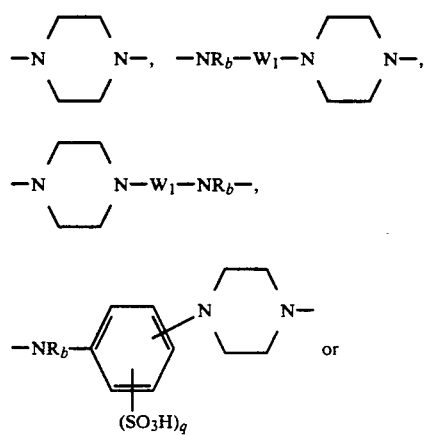

-continued

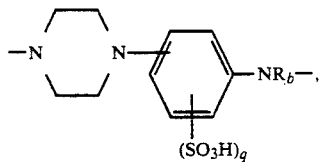

wherein W₁ is linear or branched $C_{2-4}$alkylene, Y$_{2a}$ is linear or branched $C_{2-6}$alkylene; linear or branched $C_{3-6}$alkylene interrupted by —O—, —S— or —NR$_b$—; linear or branched $C_{3-6}$alkylene monosubstituted by hydroxy; cyclohexylene;

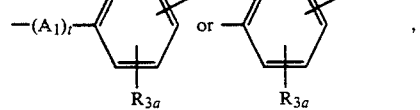

wherein
A₁ is linear or branched $C_{1-4}$alkylene, and
R$_{3a}$ is hydrogen, chloro, methyl, methoxy, —COOH or —SO₃H, or
—NR$_b$—Y$_{2a}$—NR$_b$— is

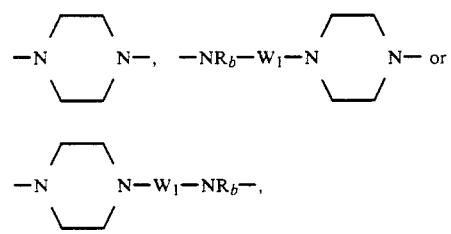

wherein
W₁ is linear or branched $C_{2-4}$alkylene, and
m is 0 or 1,
wherein
each R$_b$ is independently hydrogen, methyl, ethyl or $C_{2-3}$alkyl monosubstituted by hydroxy or methoxy, each q is independently 0 or 1, and
each t is independently 0 or 1,
or a mixture thereof.

11. A compound according to claim 10, or a salt thereof,
wherein each of T$_{1a}$ and T$_{2a}$ is chloro,
or a mixture thereof.

12. A compound according to claim 10, or a salt thereof,
wherein each R$_b$ is independently hydrogen or methyl, and
Y$_{1a}$ is linear or branched $C_{2-4}$alkylene, linear or branched $C_{3-4}$alkylene monosubstituted by hydroxy,

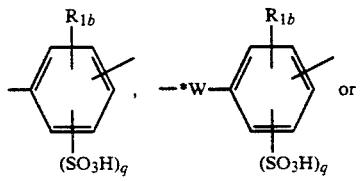

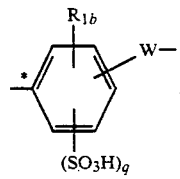

wherein
R$_{1b}$ is hydrogen, chloro, methyl, methoxy or —COOH,
W is linear or branched $C_{1-4}$alkylene,
the * denotes the carbon atom attached to the nitrogen atom attached to Ring A, and
q is 0 or 1,
or a mixture thereof.

13. A compound according to claim 10, or a salt thereof,
wherein m is 0,
or a mixture thereof.

14. A compound according to claim 1 having the formula

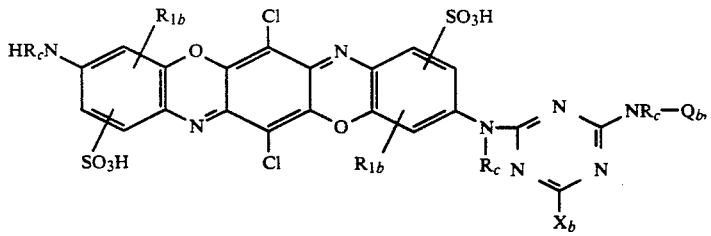

or a salt thereof,
wherein Q$_b$ is

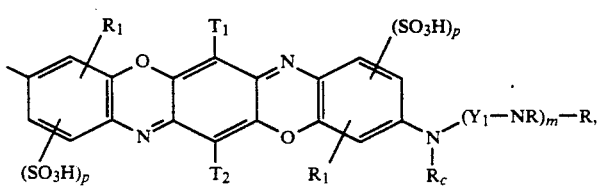

-continued

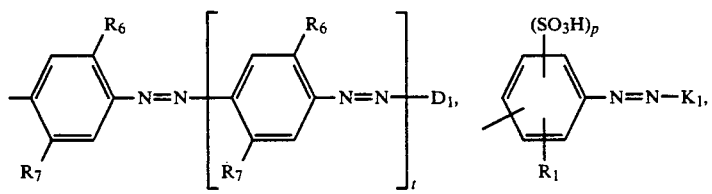

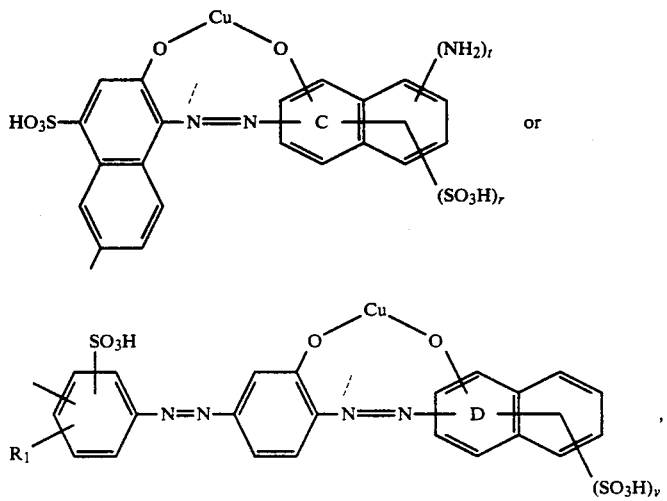

wherein $D_1$ is

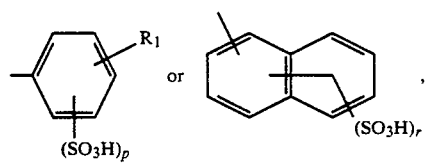

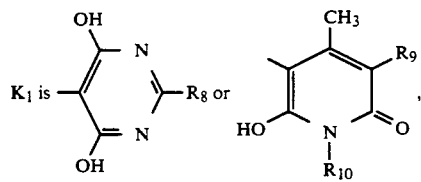

wherein
$R_8$ is —OH or —NHCN,
$R_9$ is hydrogen, cyano, —CONH$_2$ or —CH$_2$SO$_3$H, and
$R_{10}$ is hydrogen, C$_{1-4}$alkyl or —A$_2$—NR$_4$R$_5$,
  wherein A$_2$ is linear or branched C$_{2-4}$alkylene or linear or branched C$_{3-4}$alkylene monosubstituted by hydroxy,
each R$_6$ is independently hydrogen, C$_{1-4}$alkyl, C$_{1-4}$alkoxy, —NHCO—C$_{1-4}$alkyl or —NHCONH$_2$,
each
  R$_7$ is independently hydrogen, C$_{1-4}$alkyl or C$_{1-4}$alkoxy, and
  v is 2 or 3,
  with the proviso that the —O— and —N=N— radicals attached to Rings C and D are ortho to each other and are in the 1- and 2- or 2- and 1-positions of the ring to which they are attached,
each R$_c$ is independently hydrogen or methyl,
each R$_{1b}$ is independently hydrogen, chloro, methyl, methoxy or —COOH, and X$_b$ is chloro or —NR$_{4a}$R$_{5a}$,
  wherein each of R$_{4a}$ and R$_{5a}$ is independently hydrogen; C$_{1-4}$alkyl; C$_{1-4}$alkyl monosubstituted by chloro, hydroxy, methoxy, —COOH, —SO$_3$H or —OSO$_3$H; cyclohexyl; phenyl; phenyl substituted by one or two substituents selected from chloro, methyl, ethyl, methoxy, ethoxy, —SO$_3$H and —NH$_2$; benzyl or benzyl the phenyl ring of which is substituted by one or two substituents selected from chloro, methyl, ethyl, methoxy, ethoxy, —SO$_3$H and —NH$_2$, or
  —NR$_{4a}$R$_{5a}$ is piperidino, morpholino, piperazino or N'-methylpiperazino,
wherein each r is independently 1, 2 or 3, or a mixture thereof.

15. A compound according to claim 14, or a salt thereof,
  wherein each R$_c$ is hydrogen, and
  each R$_{1b}$ is hydrogen,
or a mixture thereof.

16. A compound according to claim 14, or a salt thereof,
  wherein Q$_b$ is

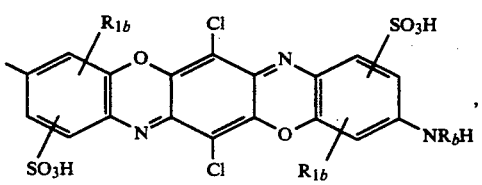

wherein
R$_b$ is hydrogen, methyl, ethyl or C$_{2-3}$alkyl monosubstituted by hydroxy or methoxy, and
each R$_{1b}$ is independently hydrogen, chloro, methyl, methoxy or —COOH, and
X$_b$ is —NR$_{4b}$R$_{5b}$, wherein each of $R_{4b}$ and $R_{5b}$ is independently hydrogen; methyl; ethyl; $C_{2-3}$alkyl monosubstituted by hydroxy or —$SO_3H$; cyclohexyl; phenyl or sulfophenyl, or
—$NR_{4b}R_{5b}$ is morpholino,
or a mixture thereof.

17. A compound according to claim 16 having the formula

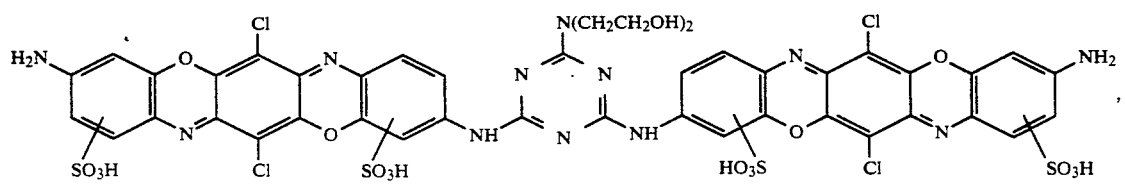

or a salt thereof,
wherein each floating sulfo group is ortho to the —$NH_2$ group or —NH— radical attached to the ring to which it is attached, or a mixture thereof.

18. A compound according to claim 13 having the formula

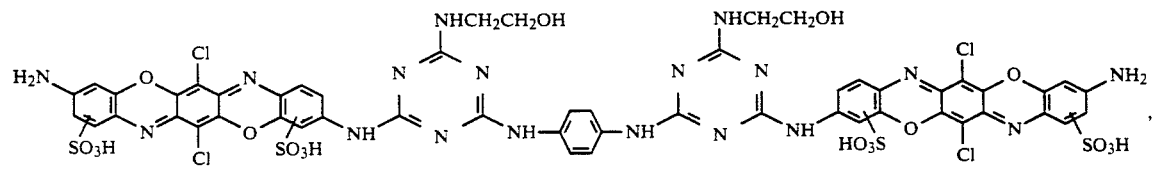

or a salt thereof, wherein each floating sulfo group is ortho to the —$NH_2$ group or —NH— radical attached to the ring to which it is attached,
or a mixture thereof.

19. A compound according to claim 13 having the formula

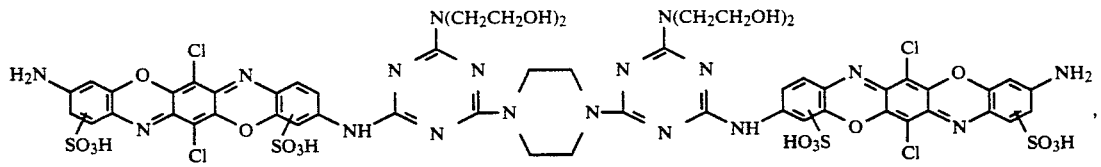

or a salt thereof,
wherein each floating sulfo group is ortho to the —$NH_2$ group or —NH— radical attached to the ring to which it is attached,
or a mixture thereof.

20. A storage stable, aqueous liquid dyeing composition comprising a compound according to claim 1 in water-soluble salt form, or a mixture thereof.

21. A process for dyeing or printing a hydroxy group- or nitrogen-containing organic substrate comprising applying to a hydroxy group- or nitrogen-containing organic substrate a compound according to claim 1, or a salt thereof, or a mixture of such compounds or salts.

* * * * *